W. C. SWEAT.
GEAR.
APPLICATION FILED APR. 23, 1919.
1,334,003.
Patented Mar. 16, 1920.
3 SHEETS—SHEET 1.
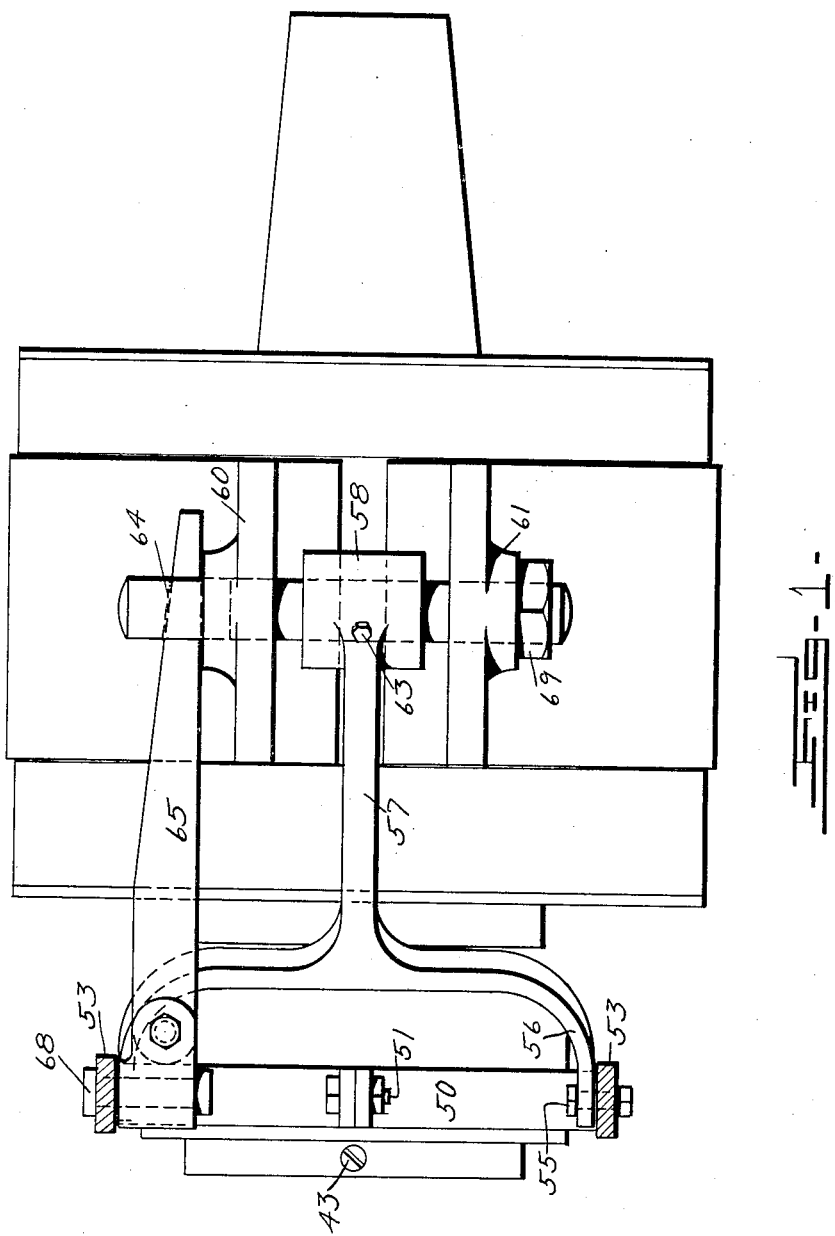
William C. Sweat,
INVENTOR
WITNESSES
BY
ATTORNEYS

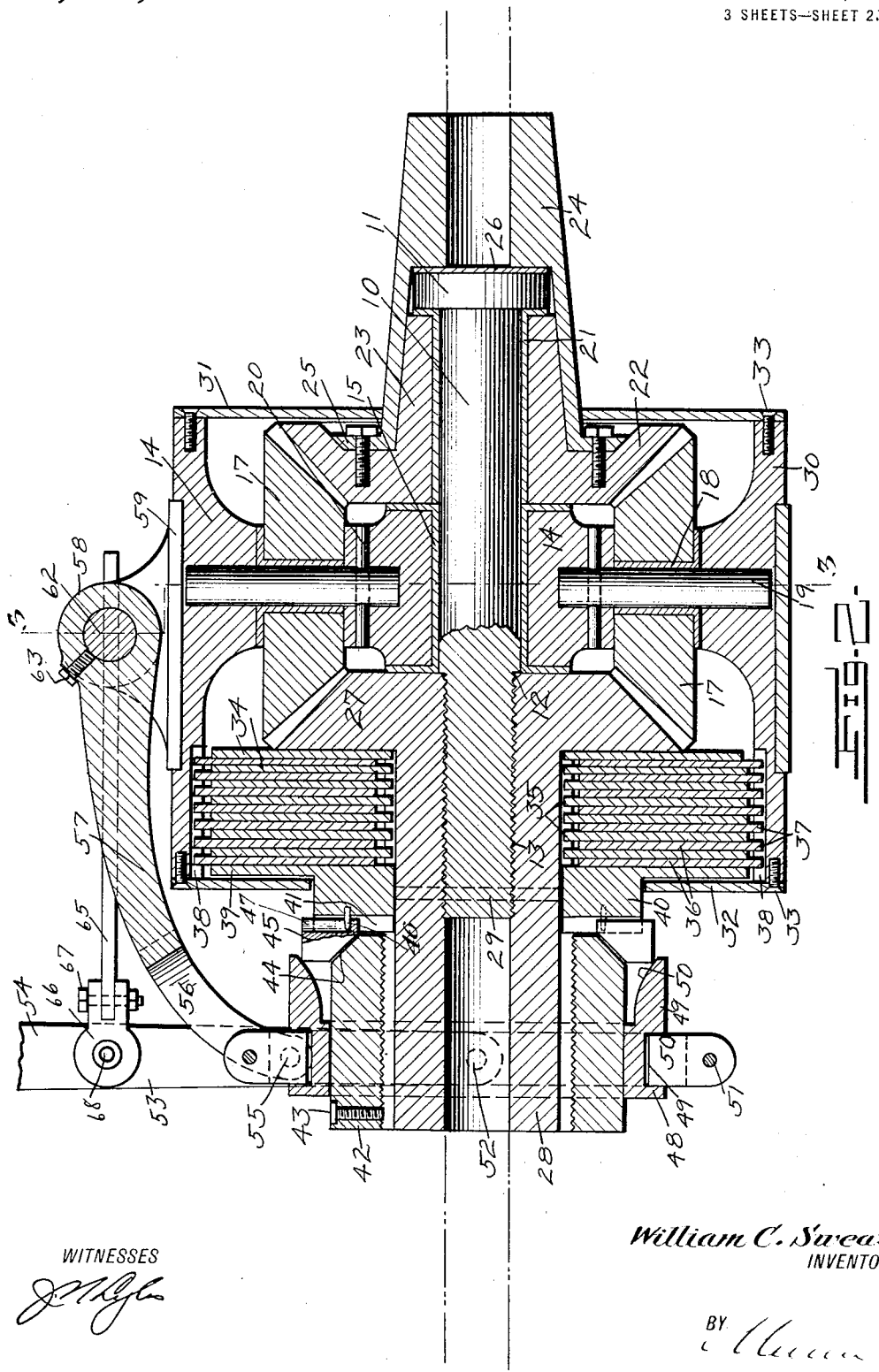

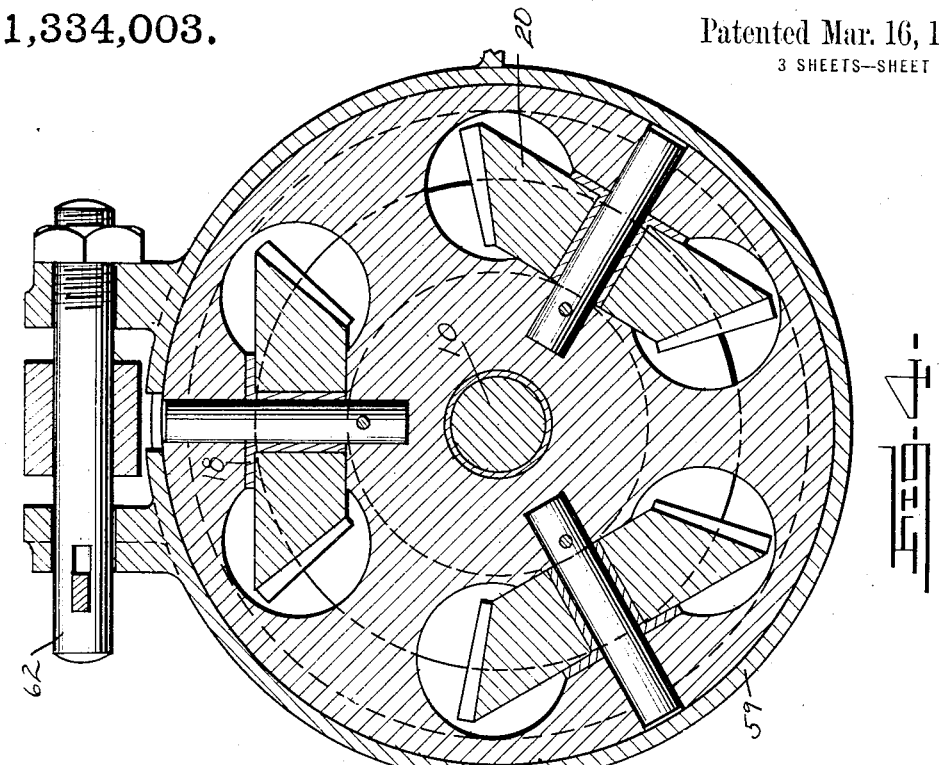
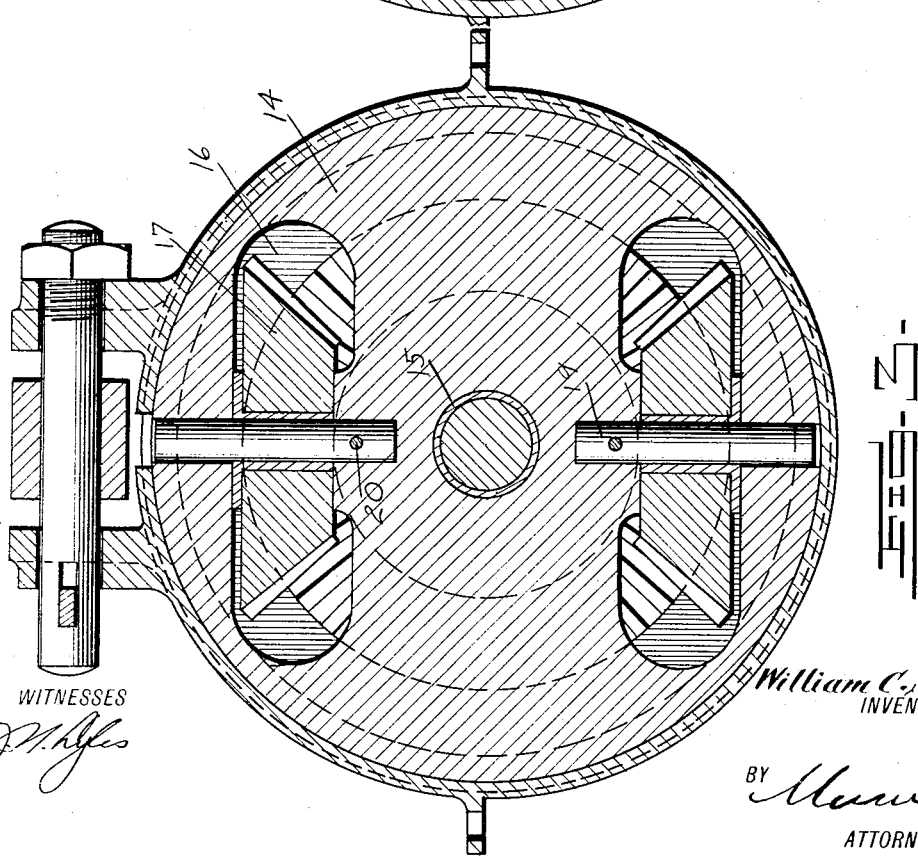

UNITED STATES PATENT OFFICE.

WILLIAM C. SWEAT, OF EVERETT, WASHINGTON.

GEAR.

1,334,003.  Specification of Letters Patent.  Patented Mar. 16, 1920.

Application filed April 23, 1919. Serial No. 292,102.

*To all whom it may concern:*

Be it known that I, WILLIAM C. SWEAT, a citizen of the United States, and a resident of Everett, in the county of Snohomish and State of Washington, have invented a certain new and Improved Gear, of which the following is a specification.

This invention relates to transmission gearing, and particularly to gearing whereby a direct or reverse drive may be secured.

One of the objects of this invention is to cause the driven shaft to travel at the same rate of speed whether it is being driven in one direction or its direction reversed.

A further object is to provide a transmission gearing of this character wherein all the gears are of a uniform diameter and wherein, therefore, all gears will travel at practically the same speed, and therefore have less tendency to heat in operation.

Another object is to provide a transmission gear that is strong and compact, and in which either of the two shaft sections may be used as the driving shaft.

Another object is to provide in a mechanism of this character, including a rotatable pinion carrier and a gear wheel co-acting therewith, a friction clutch for operatively engaging the carrier with the gear wheel for unitary motion, and simple and effective means for rendering the clutch operative, and simultaneously releasing a brake on the gear carrier, to thereby cause the driven shaft to be driven in one direction, or for rendering the clutch inoperative and applying the brake to the carrier to thereby cause the driven shaft to be rotated in a reverse direction.

Other objects have to do with the details of construction and arrangement of parts, as will appear hereinafter.

My invention is illustrated in the accompanying drawings wherein—

Figure 1 is a top plan view of my mechanism,

Fig. 2 is a longiudinal vertical section,

Fig. 3 is a transverse section on the line 3—3 of Fig. 2, and

Fig. 4 is a like view to Fig. 3 but showing a slight modification.

In the embodiment of the invention illustrated, 10 designates a short shaft section having a head 11 at one end, a shoulder 12 midway its length, and beyond the shoulder being screwthreaded as at 13.

Rotatably mounted on the shaft section 10, is a pinion carrier 14, this is carried on a bronze bushing 15, and the carrier is formed with openings 16, to accommodate pinions 17. These pinions are mounted on bearing bushings 18 through which pass the pinion shafts 19, having their ends disposed in sockets in the carrier and held from displacement by pins 20.

Mounted on a bushing 21, between bushing 15 and head 11, is a gear wheel 22 meshing with pinions 17, and having an elongated hub 23, extending to the head 11. This hub is tapered and fitting over the tapered hub is tapered member 24,—which may constitute a coupling, to engage a shaft section shown in dotted lines, or power may be transmitted directly to or taken directly from this member 24. The member 24 has a flange 25 at its inner end through which screws 26 pass to connect it to the gear wheel 22. A bronze disk 26 is disposed between the end head 11, and the inner shoulder of the tubular member 24.

Mounted on the screw-threaded portion 13 of shaft section 10, is a gear wheel 27 which as shown is integral with a tubular shaft section 28 or sleeve, with which a shaft section indicated by dotted lines, may be engaged. This gear wheel 27 meshes with pinions 17, and the sleeve 28 is fixed to shaft 10 by a pin 29.

The carrier 14, is laterally extended at its periphery as at 30, so as to form a hollow cylinder inclosing the gears 17, 22 and 27, and this cylinder is closed at one end by an annular head 31, and at its opposite end of an annular head 32, these heads being held in place by screws 33.

Surrounding the tubular shaft section or sleeve 28, is a plurality of friction disks 34, annular in form, but having lugs 35, which engage in longitudinal grooves in the exterior face of sleeve 28.

Disposed alternately to the disks 34, are a series of friction disks 36, having outwardly projecting lugs 37, which engage in longitudinal grooves 38, cut in the inner face of the rim 30 of the carrier. When these disks are pressed together they will frictionally engage and consequently the carrier 14 will turn with the gear 27. When the disks are relieved from pressure the gear wheel 27 will turn independently.

In order to force the disks 34 and 36 into contact, I have provided a sliding disk 39 having a hub 40 which projects out through the opening in the head 32. This hub is diametrically slotted at 41, and is shiftable longitudinally on shaft section 28.

Having operative, screw-threaded engagement with shaft section 28, is a nut 42, which, after it is screwed in place, is held by a set screw 43. This nut is beveled at 44. Disposed in the grooves 41 are wedges 45, which have each a beveled face bearing against the face 44. These wedges move radially in the grooves 41, and are held from undue outward movement by pins 46, projecting from the hub 40, and into grooves 47 formed on the inside faces of the wedges 45.

For the purpose of forcing the wedges 45 inward, I provide a slidable annulus 48, having a laterally extending flange 49 whose inner face is flared outward to have wedging engagement with the wedges 45. This annulus 48 is circumferentially grooved at 49, to receive a shipper ring 50, which is formed of two sections, flanged and bolted to each other by bolts 51. To this ring 50 is pivotally connected at 52, the two branches 53 of a forked lever 54. This lever is fulcrumed at 55 upon the two arms 56 of a bracket 57, which at its end has a sleeve 58. The rim 30 of the carrier 14 is circumferentially grooved to receive a brake band 59 which embraces the rim 30, and has its ends formed with outwardly extending flanges 60, having laterally projecting bosses 61. A pin 62 passes through these bosses and flanges, and through the sleeve or eye 58. A set screw 63, holds the bracket in fixed relation to the pin.

It is necessary in the operation of my gearing, that the brake-band 59 be tightened when the clutch disks 34 and 36 are released and slackened when the clutch is applied. To this end, one end of the pin 62 is formed, with a slot 64 (see Fig. 1) one wall of which is beveled. Operating in this slot is a wedge-shaped rod or pin 65, which at its other end is pivotally connected to a member 66, by a vertical bolt 67, this member being in turn pivoted to one arm 53 of lever 54, by a bolt 68. Thus a universal joint connection is formed between pin 65, and lever 54. Now when the upper end of lever 54 is moved to the right in Fig. 2, the clutch disks 34 and 36 will be relieved of pressure, and the wedge shaped pin 65 will cause the bolt 62 to draw laterally, compressing the ends of the brake-band between the nut 69 on the bolt and the wedge 65 and contracting the brake band upon the rim 30.

It will be seen that the disks 34 and 36 and allied parts constitute a clutch whereby gear wheel 27 and the carrier 14 may be caused to move together, or whereby these parts may move independently, and that the brake band 59, and allied parts constitute means whereby the carrier 14, may be held from rotation. The parts 39, 40, 42 and 45, with the lever 54 constitute clutch actuating means, while the lever 54, wedge-like pin 65 and pin 62, constitute brake actuating means.

The operation of my mechanism is as follows:—

Power may be applied at either end of the gearing, or in other words, the member 24 may be either a driving element or a driven element. I shall assume, however, that it is the driving element. If now the brake band 59 be contracted on the carrier rim or drum 30, the carrier will be held from rotation. The clutch disks 34 will be free to rotate without rotating disks 36. A rotation of member 24 will rotate gear wheel 22, which will rotate pinions 17, these will cause rotation of gear wheel 27, and the driven shaft section at a speed practically the same as the driving shaft section 24, but reversely thereto.

If now the lever 54 being shifted to the left in Fig. 2 the brake band will expand, releasing the carrier 14, and the carrier will be simultaneously clutched to the tubular driven shaft 28, and thus, as the pinions 17 are locked from rotation, the gear wheel 22, carrier 14 and tubular shaft 28 will all rotate together and in the same direction. By the means described therefore, I can secure a rotation of the driven element either in the same direction as or reversely to the driving element, and in either case at practically the same speed.

It will be obvious that this mechanism may be applied in many different ways, and in widely differing circumstances, and that the mechanism may be changed and varied without departing from the principle thereof.

The various parts are held centered by the central shaft section 10, and may be easily assembled or dis-assembled.

As before stated, any number of pinions, may be used on the carrier and in Fig. 4 I have illustrated a carrier 14, with three pinions 20 instead of two. Otherwise than this, the construction is the same in Fig. 4 as in Fig. 3.

It will be noted that the gear runs neutral at the point where the clutch is thrown off and before the brake is applied or when the brake is released and before the clutch is thrown in.

I claim;—

1. A transmission mechanism comprising a driving element and a driven element, having confronting gear wheels, a rotatable pinion carrier having pinions meshing with the gear wheels, means shiftable into position to hold the carrier from rotation or out of said position, a clutch comprising co-acting friction disks, alternate disks being engaged with the carrier and the other disks with one of said elements, means for shifting the carrier holding means into or out of engagement with the carrier, and means for forcing the disks into or out of frictional engagement with each other, and including a member longitudinally movable along the disk carrying element and exerting pressure on the disk, radially movable wedges operatively engaging said member, an annulus having a bevel faced annular flange engageable over the wedges to force them inward, and manually operable means for shifting said annulus.

2. A transmission mechanism comprising a driving element and a driven element, having confronting gear wheels, a rotatable pinion carrier having pinions meshing with the gear wheels, means shiftable into position to hold the carrier from rotation or out of said position, a clutch comprising co-acting friction disks, alternate disks being engaged with the carrier and the other disks with one of said elements, means for shifting the carrier holding means into or out of engagement with the carrier, and means for forcing the disks into or out of frictional engagement with each other, and including a member longitudinally movable along the disk carrying element, and exerting pressure on the disks, and having radial grooves on its outer face, radially movable wedges disposed in said grooves, means limiting the outward movement of the wedges, a sleeve against which the wedges abut, a ring movable longitudinally on the sleeve, and having an annular flange having a flaring inner surface engaging the wedges, and a lever operatively connected to the ring to shift it.

3. A transmission mechanism comprising a driving and a driven element, having confronting gear wheels a rotatable pinion carrier having pinions meshing with the gear wheels, the carrier having an annular rim, a brake engageable with the rim, a clutch operating to connect or disconnect the carrier and one of the gear wheels, a bracket supported by the brake, a lever fulcrumed on the bracket and operatively engaging the clutch to shift it into or out of operative position, and a brake actuating member operatively connected to the lever, to be shifted into operative position when the clutch is released, or into inoperative position when the clutch is rendered operative.

4. A transmission mechanism comprising a driving and a driven element having confronting gear wheels, a rotatable pinion carrier between the gear wheels and having pinions, meshing therewith, the carrier having an annular rim, a contractible and expansible brake band embracing the rim, a clutch operating to connect or disconnect the carrier and one of said elements, a pin connecting the ends of the brake band, a bracket mounted on the pin, an actuating member pivoted on said bracket, and operatively connected to the clutch, and means, connected to and operated by the member causing the contraction of the brake band when the clutch is thrown out, and permitting the expansion of the band when the clutch is thrown in.

5. A transmission mechanism comprising a driving and a driven element having confronting gear wheels, a rotatable pinion carrier between the gear wheels and having pinions meshing therewith, the carrier having an annular rim, a contractible and expansible brake band embracing the rim, a clutch operating to connect or disconnect the carrier and one of said elements, a pin connecting the ends of the brake band, a bracket mounted on the pin, an actuating member pivoted on said bracket, and operatively connected to the clutch, and means, connected to and operated by the member causing the contraction of the brake band when the clutch is thrown out and permitting the expansion of the band when the clutch is thrown in and comprising a wedge engaging facing abutments on the band and pin, and holding the pin and bracket from rotation.

WILLIAM C. SWEAT.

Witnesses:
   WILLIAM SHELLER,
   CHARLES A. DAVIS.